United States Patent [19]

Okawa et al.

[11] 4,188,663
[45] Feb. 12, 1980

[54] PROTECTIVE DEVICE OF A CURRENT SOURCE INVERTER

[75] Inventors: Tadashi Okawa; Mitsuyuki Honbu; Yasuo Matsuda, all of Hitachi, Japan

[73] Assignee: Hitachi, Ltd., Japan

[21] Appl. No.: 877,982

[22] Filed: Feb. 15, 1978

[30] Foreign Application Priority Data

Feb. 16, 1977 [JP] Japan .................................. 52-15027

[51] Int. Cl.$^2$ ........................ H02M 7/00; H02M 5/45
[52] U.S. Cl. ........................................ 363/51; 363/37; 363/96
[58] Field of Search ...................... 363/13, 34, 35, 37, 363/50-55, 87, 96; 361/92

[56] References Cited

U.S. PATENT DOCUMENTS

| | | | |
|---|---|---|---|
| 3,273,043 | 9/1966 | Clarke et al. | 363/85 X |
| 3,584,259 | 6/1971 | Traub et al. | 361/86 X |
| 3,749,944 | 7/1973 | Luebrecht | 361/92 X |
| 4,028,607 | 6/1977 | Watanabe | 363/51 |
| 4,066,954 | 1/1978 | Vukasovic et al. | 363/37 |
| 4,086,621 | 4/1978 | Vukasovic | 363/37 |

Primary Examiner—J. D. Miller
Assistant Examiner—Peter S. Wong
Attorney, Agent, or Firm—Craig and Antonelli

[57] ABSTRACT

A current source inverter having a converter for changing alternating current into direct current, an inverter for changing the d.c. output of the converter into alternating current, and a reactor interposed between the converter and the inverter comprises power failure detecting means for detecting the power failure of the a.c. input of the converter. The power failure detecting means is constructed of square wave generator circuits which generate square waves when voltages in respective polarities of respective phases of the a.c. input exist, an adder which adds the outputs of said square wave generator circuits, and a comparator which compares an output of said adder with a predetermined value and which provides an output when the adder output is below the predetermined value. Both terminals of the reactor of the current source inverter are substantially short-circuited by the output of said power failure detecting means, thereby to prevent occurrence of an overvoltage at the time of the power failure of the a.c. input of the converter.

16 Claims, 8 Drawing Figures

PROTECTIVE DEVICE OF A CURRENT SOURCE INVERTER

BACKGROUND OF THE INVENTION

This invention relates to a current source inverter. More particularly, it relates to a current source inverter with a protective device which suppresses an overvoltage appearing in case of a power failure of an a.c. power source for supplying a.c. power to the current source inverter.

A current source inverter is constructed of a converter for changing alternating current into direct current, an inverter for changing the d.c. output of the converter into alternating current, and a reactor disposed in a d.c. circuit between the converter and the inverter. The reactor functions as a current source. Such current source inverters are disclosed in, and known from, for example, U.S. Pat. No. 3,796,935 and U.S. Ser. No. 716,205.

In the current source inverters, the d.c. circuit is provided with the reactor of large reactance. Therefore, when an accident as suddenly cuts off the circuit through which the direct current flows occurs, a great voltage is generated owing to energy held by the reactor. This voltage results in breaking down the converter. In case where an input power source of the converter has gone "off," the converter ceases its operation and therefore acts similarly to abruptly cutting off the circuit through which the direct current flows. In this case, accordingly, the same problem is involved.

In order to solve this problem, the power failure of the input power source is detected, and both terminals of the reactor are substantially short-circuited at the time of the power failure, thereby to prevent the high voltage from being generated in the reactor. However, when the period of time for detecting the power failure of the a.c. input power source becomes long, the generation of the high voltage cannot be satisfactorily prevented even by the aforecited protective operation at the time of power failure.

SUMMARY OF THE INVENTION

An object of this invention is to provide a protective device of a current source inverter as can quickly detect the power failure of an a.c. input power source to a converter and can protect the current source inverter at the time of the power failure.

Another object of this invention is to provide a protective device of a current source inverter as has means capable of quickly detecting the power failure of an a.c. input power source while discriminating it from instantaneous abnormalities thereof.

Still another object of this invention is to provide a protective device of a current source inverter as is capable of preventing the generation of an overvoltage by adjusting the ignition phases of thyristors of a converter in case where a three-phase a.c. input power source lacks by one phase, and by substantially short-circuiting both terminals of a reactor in the other cases.

According to this invention, the objects can be accomplished by a protective device of a current source inverter comprising a converter which changes alternating current into direct current and which is made up of thyristors, an inverter which changes the d.c. output of said converter into alternating current, a reactor which is connected between said converter and said inverter, control circuits which control an output voltage of said converter and an output frequency of said inverter, square wave generating circuits which change an a.c. voltage to become the input of said converter into square waves corresponding to respective polarities of respective phases, an adding circuit which adds the square wave outputs of said square wave generating circuits, a decision circuit which provides an output when an output of said adding circuit has become less than a predetermined value, and thyristors which are rendered conductive in response to the output of said decision circuit and form a circulating circuit for releasing energy stored in said reactor.

As the thyristors forming the circulating circuit, there can be used at least one pair of thyristors of the converter as are rendered conductive to execute a bypass pair operation, a thyristor which is disposed in parallel with the converter, or a thyristor which is disposed in parallel directly between both terminals of the reactor. The output of the decision circuit can be added to a control signal of the control circuit for controlling the converter and then transmitted to the paired thyristors constituting the converter. As the square wave generating circuits, there can be used square wave generating circuits which transmit square waves to triangular wave generating circuits that generate reference phases for igniting the thyristors constituting the converter.

In order to prevent an erroneous detection as the power failure, of a short-duration abnormality of the a.c. voltage attributed to any disturbance, there is disposed a malfunction preventing circuit which produces an output only in case where the output of the adding circuit is below the predetermined value continuously for a predetermined time.

Further, the protective device of the current source inverter can be so constructed that the lack of one phase and the lack of two or more phases in the three-phase a.c. input to the converter are separately and respectively detected by a first decision circuit and a second decision circuit, to control the voltage control circuit for the converter by an output of the first decision circuit so as to lower the output voltage of the converter, and to render the thyristors conductive by an output of the second decision circuit, said thyristors forming the circulating circuit for releasing the energy stored in the reactor.

Other objects of this invention will become apparent from the following description of the embodiments taken in conjunction with the drawings.

DESCRIPTION OF THE PREFERRED EMBODIMENTS

Figure 1:
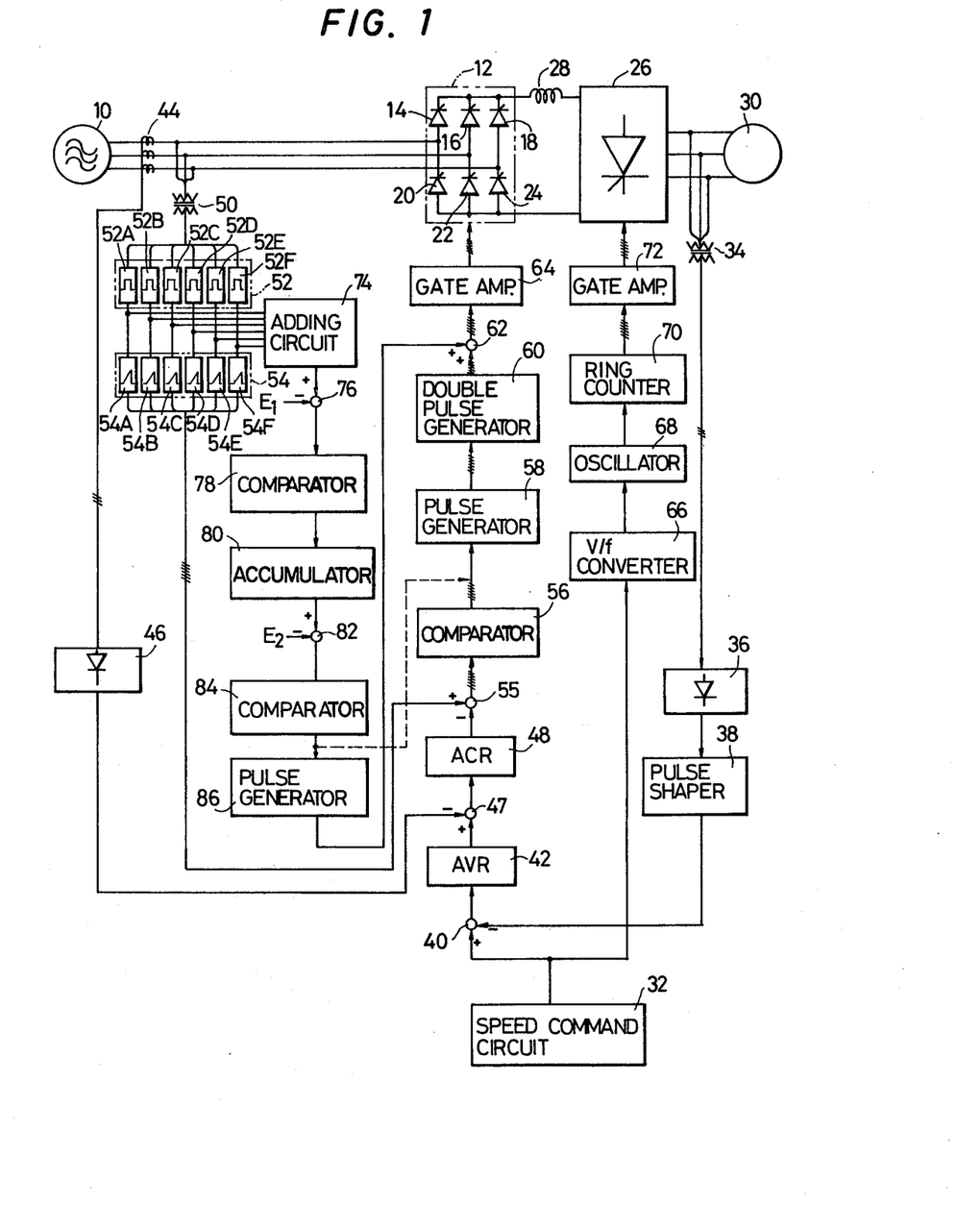
FIG. 1 is a circuit diagram of a protective device of a current source inverter showing an embodiment of this invention.

FIG. 1 shows an embodiment of this invention. Referring to the figure, a converter 12 is connected to a three-phase a.c. power source 10. The converter 12 is constructed by bridge-connecting thyristors 14, 16, 18, 20, 22 and 24, and it changes alternating current into direct current. The d.c. output of the converter 12 is transmitted to an inverter 26, which changes direct current into alternating current. In a d.c. intermediate circuit between the converter 12 and the inverter 26, a reactor 28 is incorporated. The reactor 28 has a large inductance as sustains to cause a direct current to flow, and it functions as a current source. The a.c. output of the inverter 26 is transmitted to an a.c. motor 30 being a load, to drive the motor. Used as the a.c. motor 30 is, for example, an induction motor. The converter 12 and the inverter 26 are controlled in response to an output of a speed command circuit 32. The output of the speed command circuit 32 is partly transmitted to a control system for the output voltage of the converter 12, and is partly transmitted to a control system for the output frequency of the inverter 26. A terminal voltage of the a.c. motor 30 is detected by a voltage transformer 34 and is transmitted to an adder 40 through a rectifier circuit 36 as well as a pulse shaper 38. The output of the speed command circuit 32 is also transmitted to the adder 40. The adder 40 compares the voltage commanded by the speed command circuit 32 and the terminal voltage of the a.c. motor 30, and transmits an output to an automatic voltage regulator (AVR) 42. The AVR 42 generates a predetermined output according to the deviation between both the voltages. The input current of the converter 12 is detected by a current transformer 44, an output of which is transmitted to an adder 47 through a rectifier circuit 46. The adder 47 compares an output of the rectifier circuit 46 and the output of the AVR 42 and transmits the deviation to an automatic current regulator (ACR) 48. The ACR 48 generates a predetermined output according to the deviation. In order to detect the phases of the input voltage of the converter 12, there are disposed a voltage transformer 50, a square wave generator 52, and a triangular wave generator 54 which generates triangular waves of phases responsive to outputs of the square wave generator 52. The square wave generator 52 is made up of square wave generating circuits 52A, 52B, 52C, 52D, 52E and 52F that generate six-phase square waves of predetermined magnitude during a period during which voltages in respective polarities of respective phases exist, as will be stated later. The triangular wave generator 54 is made up of triangular wave generating circuits 54A, 54B, 54C, 54D, 54E and 54F that generate six-phase triangular waves of phases corresponding to the six-phase square waves. An output of the triangular wave generator 54 and the output of the ACR 48 are transmitted to an adder 55, from which the deviations between the six-phase triangular waves of the triangular wave generator 54 and the output of the ACR 48 are transmitted to a comparator 56. The comparator 56 provides an output when the triangular wave has become greater than the output of the ACR 48. A pulse generator 58 generates an output pulse at the time of rise of the output of the comparator 56. A double pulse generator 60 provides a pulse which is delivered at the beginning of a period for conducting each thyristor of the converter 12, and a pulse which lags 60° over the first-mentioned pulse. The double pulse generator 60 is disposed in order to stably operate the converter 12, and need not be always incorporated. The output of the double pulse generator 60 is transmitted to a gate amplifier 64 through an adder 62. A signal amplified by the gate amplifier 64 is transmitted to the gates of the respective thyristors 14–24 of the converter 12 and renders the thyristors 14–24 conductive.

The output of the speed command circuit 32 is transmitted to respective thyristors of the inverter 26 through a V/f converter 66, and oscillator (OSC) 68, a ring counter 70 and a gate amplifier 72, and it renders the respective thyristors of the inverter 26 conductive at a predetermined period. Thus, the inverter 26 generates the a.c. output of a predetermined frequency commanded by the speed command circuit 32.

Power failure detecting means for detecting the power failure of the a.c. power of the converter 12 is disposed. The power failure detecting means is made up of an adding circuit 74 which adds the six-phase outputs of the square wave generator 52, an adder 76 to which an output of the adding circuit 74 and a predetermined output $E_1$ are transmitted, a comparator 78 to which the deviation between both these outputs is transmitted from the adder 76 and which provides an output when the output of the adding circuit 74 has become smaller than the predetermined voltage $E_1$, an accumulator 80 which accumulates the outputs of the comparator 78, an adder 82 to which an output of the accumulator 80 and a predetermined voltage $E_2$ are transmitted, a comparator 84 which provides an output when the output of the accumulator 80 has become greater than the predetermined voltage $E_2$, and a pulse generator 86 which operates at the rise of the output of the comparator 84 and provides a pulse of predetermined width. The output of the pulse generator 86 is transmitted to the adder 62, and in the presence of the output of the pulse generator 86, an ignition signal is bestowed on the predetermined thyristor of the converter 12.

The operation of the protective device thus constructed will be described with reference to FIGS. 2 and 3.

Figure 2:
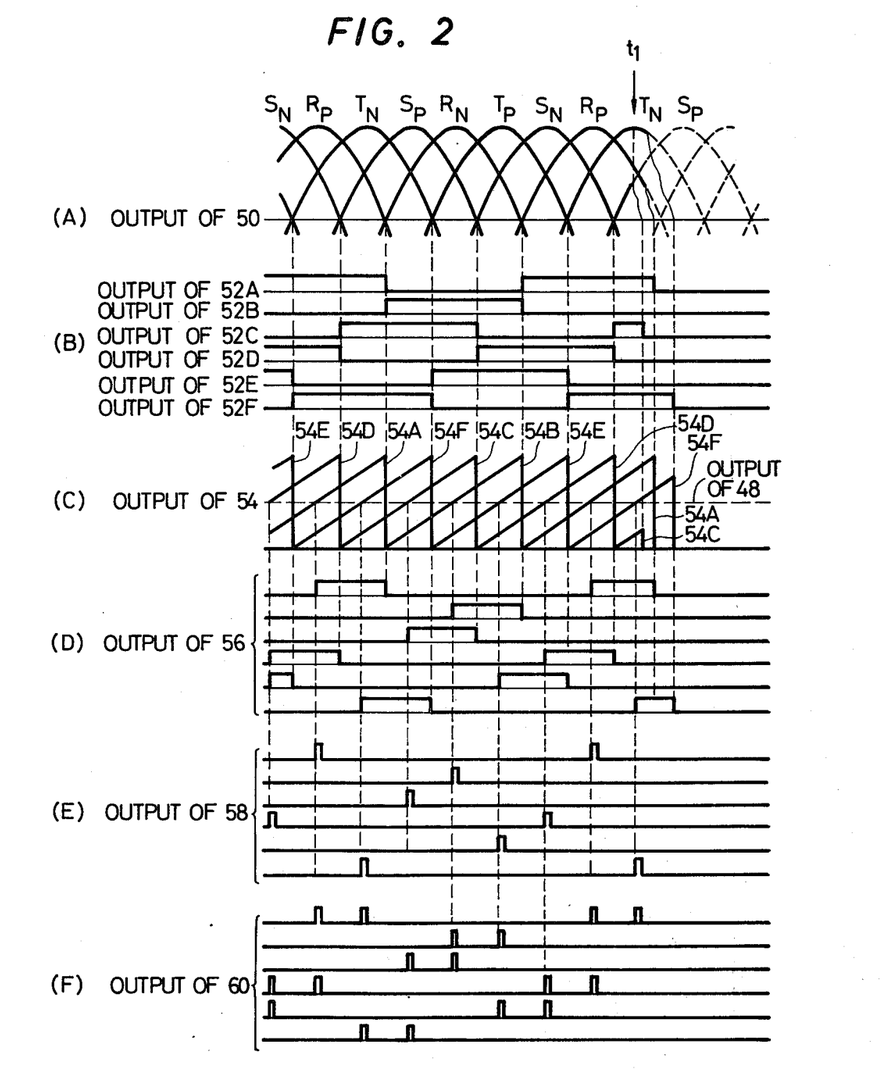
FIG. 2 is a waveform diagram for explaining the circuit operation of the embodiment in FIG. 1.

In FIG. 2, (A) shows output voltage waveforms $U_P$, $U_N$, $V_P$, $V_N$, $W_P$ and $W_N$ of the voltage transformer 50. In this manner, the three phases are changed into the six phases. In the illustration, a power failure has occurred at a time $t_1$. (B) shows outputs of the respective square wave generating circuits 52A–52F of the square wave generator 52. The circuits 52A–52F provide the square wave of predetermined magnitude when the voltages of the respective phases shown in (A) are positive. (C) shows outputs of the respective triangular wave generating circuits 54A–54F of the triangular wave generator 54 and an output of the ACR 48. The triangular wave generator 54 operates so that the square waves shown in (B) may be integrated from times of the transmission thereof so as to produce the triangular waves and that the integrations may be reset at times of the disappearance of the square waves. (D) shows outputs of the comparator 56. The comparator 56 provides the outputs when the triangular waves have exceeded the outputs of the ACR as illustrated in (C). (E) shows outputs of the pulse generator 58. The pulse generator 58 is operated by the rises of the outputs of the comparator 56 as shown in (D) and generates the pulses of width of predetermined value. The pulse width may be a value enough to ignite the thyristor of the converter 12. (F) shows outputs of the double pulse generator 60. Besides the pulses of the outputs of the pulse generator 58 as shown in (E), the pulses lagging by 60° over these pulses are provided as apparent from the illustration.

Figure 3:
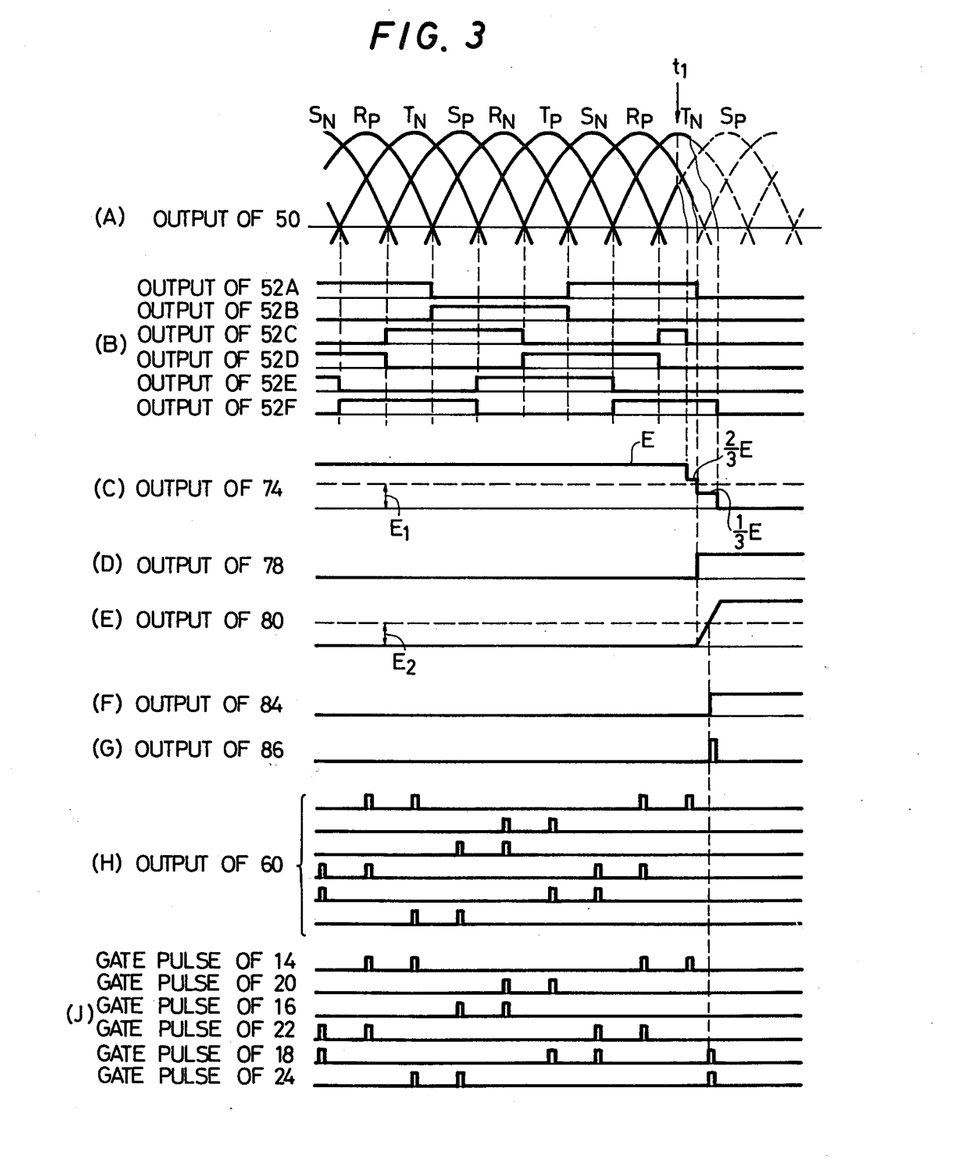
FIG. 3 is a waveform diagram for explaining the circuit operation of the embodiment in FIG. 1.

FIG. 3 shows the operation of the power failure detecting circuit. In the figure, (A) shows the output voltage waveforms of the voltage transformer 50 and (B) the outputs of the square wave generator 52, and these are the same as (A) and (B) in FIG. 2 respectively. (C) shows an output of the adding circuit 74. The adding circuit 74 adds the outputs of the respective square wave generating circuits 52A, 52B, 52C, 52D, 52E and 52F as shown in (B). Since it adds the outputs of three of the square wave generating circuits at any time, it provides under the steady state an output voltage E being triple the output voltage of one square wave generating circuit. However, when the power failure has occurred, the output voltage of the adding circuit 74 lowers to $\frac{2}{3}$E, $\frac{1}{3}$E and O successively with the extinction of the voltages of the respective phases. (D) shows an output of the comparator 78. The comparator 78 is so constructed as to operate and provide the output when the output of the adding circuit 74 has lowered to below a predetermined voltage $E_1$. Desirably, the predetermined voltage $E_1$ is selected to a value which is greater than $\frac{2}{3}$ of the steady voltage E, this value $\frac{2}{3}$E corresponding to a case where one phase lacks, and which is smaller than the steady voltage. Of course, the predetermined voltage $E_1$ may well be smaller than $\frac{2}{3}$E, but in order to detect the power failure at high speed, the aforecited value is preferable. (E) shows an output waveform of the accumulator 80. The accumulator 80 accumulates the output of the comparator 78, and it is reset when the output of the comparator 78 has become zero. (F) shows an output of the comparator 84. The comparator 84 compares the output of the accumulator 80 and a predetermined voltage $E_2$, and it provides the output when the voltage of the accumulator 80 has become greater than the voltage $E_2$. Owing to this construction wherein the accumulator 80 and the comparator 84 are disposed and wherein the comparator 84 provides the output when the output of the accumulator 80 has exceeded the predetermined voltage $E_2$; even when any disturbance enters the a.c. power source 10 and the output of the adding circuit 74 becomes smaller than the predetermined value $E_1$ for only a very short time, the accumulator 80 will be reset to prevent the comparator 84 from providing the output if the output of the adding circuit 74 becomes greater than the predetermined value $E_1$ before the output of the accumulator 80 reaches the predetermined value $E_2$. Thus, the lowering of the voltage due to the disturbance of very short duration is not detected as a power failure. (G) shows an output signal of the pulse generator 86. The signal of the pulse generator 86 transmits gate pulses to the paired thyristors of the converter, e.g., the thyristors 18 and 24 through the adder 62 and the gate amplifier 64. Although the paired thyristors 18 and 24 are exemplified here, any other pair of thyristors constituting the converter 12 may be used. In some cases, all the thyristors may be rendered conductive. (H) in FIG. 3 shows the same outputs as in (F) of FIG. 2, that is, the output signals of the double pulse generator 60. (J) in FIG. 3 shows outputs of the gate amplifier 64, that is, gate pulses of the thyristors 14, 16, 18, 20, 22 and 24. Under the steady state, the gate pulses corresponding to the outputs of the double pulse generator 60 are provided from the gate amplifier 64. On the other hand, when the power failure detecting circuit detects the power failure and the pulse of the pulse generator 86 as shown in (G) is generated, the gate pulses for igniting the paired thyristors 18 and 24 are provided from the gate amplifier 64. Thus, the energy stored in the reactor 28 owing to the current flowing through the reactor 28 circulates through the inverter 26, the a.c. motor 30, the inverter 26 and the thyristors 18 and 24 of the converter 12. For this reason, the energy stored in the reactor 28 can be conducted even if the converter 12 ceases its operation, and no high voltage is generated between the d.c. terminals of the converter 12. Although, in the above embodiment, the construction wherein the signal for igniting the paired thyristors 18 and 24 is issued through the gate amplifier 64 has been described, it is also possible to prepare another gate amplifier in addition to the gate amplifier 64 and to ignite the thyristors 18 and 24 by signals issued from both the gate amplifiers.

Figure 4:
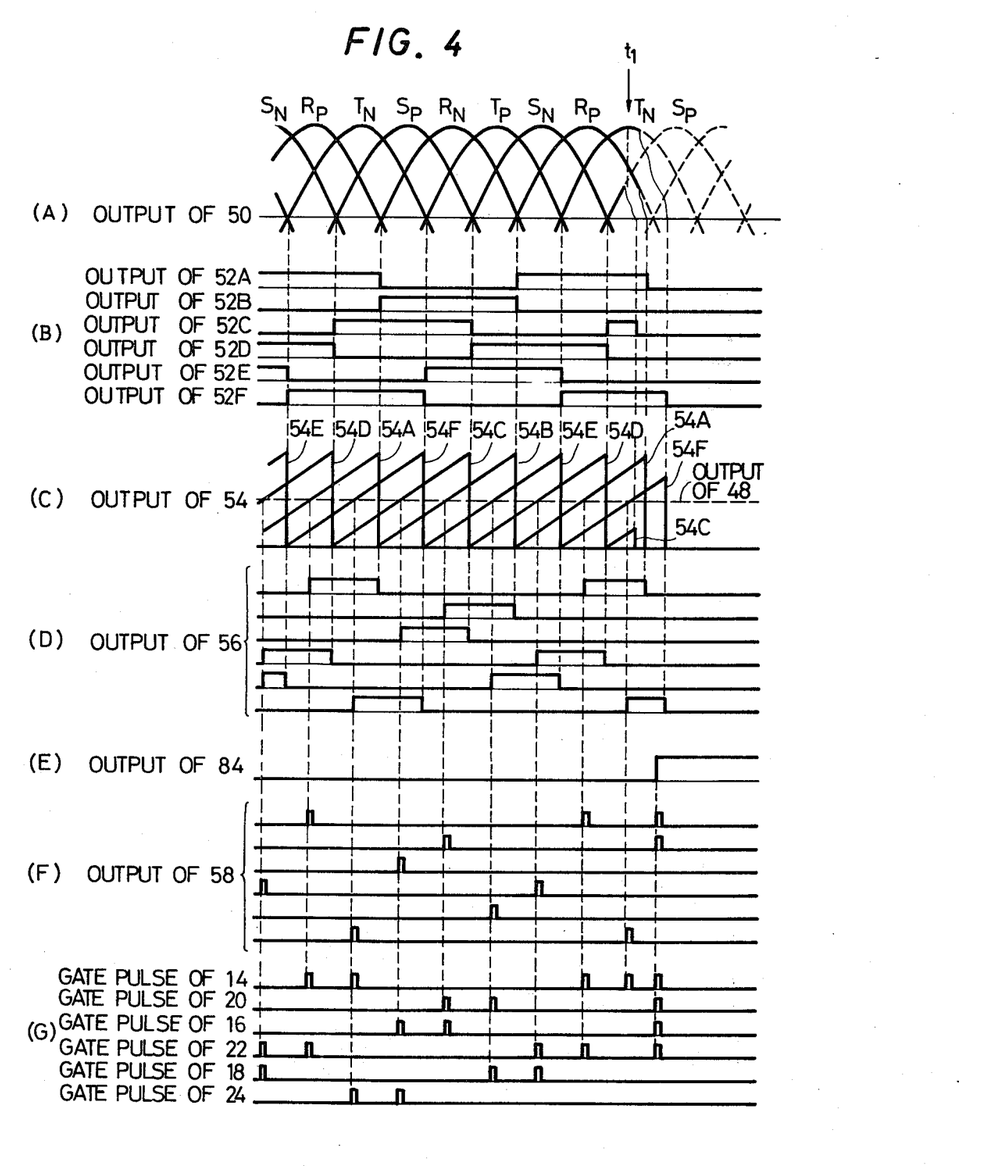
FIG. 4 is a waveform diagram for explaining the circuit operation of a protective device of a current source inverter illustrative of another embodiment of this invention.

FIG. 4 shows operating waveforms in the case of a circuit indicated by a dotted line in FIG. 1, this circuit illustrates another embodiment of this invention. The embodiment indicated by the dotted line in FIG. 1 is such that the output of the comparator 84 is added to the output of the comparator 56 and that the pulse generator 86 and the adder 62 are omitted. In FIG. 4, the same symbols as in FIG. 2 designate the equivalents. (E) in FIG. 4 shows an output signal of the comparator 84 of the power failure detecting circuit. When the output signal of the comparator 84 exists, an ignition signal for igniting the paired thyristors of the converter 12, e.g., the thyristors 14, 20 and 16, 22 is added to the output of the pulse generator 58.

In such a construction, as in the preceding embodiment, the thyristors of the converter 12 form the bypass pairs in the presence of the output from the comparator 84, making is possible to circulate the energy stored in the reactor 28 and to prevent the generation of a high voltage.

Figure 5:
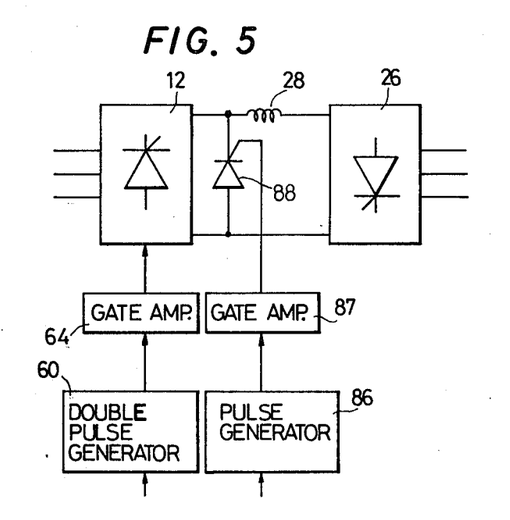
FIG. 5 is a circuit diagram of a protective device of a current source inverter showing still another embodiment of this invention.

FIG. 5 shows another embodiment of this invention. In this embodiment, the output of the pulse generator 86 of the power failure detecting circuit is fed through a gate amplifier 87 to be made a gate signal of a thyristor 88 which is disposed in parallel with the converter 12 across the d.c. terminals of the converter 12. The power failure detecting circuit in this embodiment is similar to that in the embodiment of FIG. 1. The power failure detecting circuit is capable of operating at high speed. At a power failure of the a.c. power source 10, the detecting circuit quickly detects the power failure and renders the thyristor 88 conductive. Energy stored in the reactor 28 can be circulated through a circuit extending via the inverter 26, the a.c. motor 30, the inverter 26 and the thyristor 88, so that any high voltage is prevented from being generated across the d.c. terminals of the converter 12 by the energy stored in the reactor 28.

Figure 6:
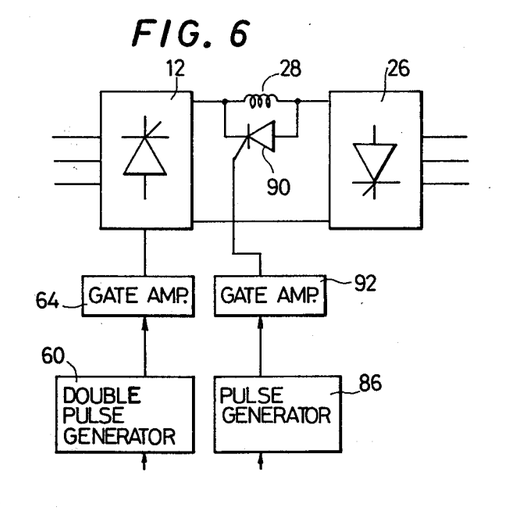
FIG. 6 is a circuit diagram of a protective device of a current source inverter showing yet another embodiment of this invention.

FIG. 6 shows still another embodiment of this invention. In this embodiment, a thyristor 90 is disposed across both the terminals of the reactor 28, and the output of the pulse generator 86 of the power failure detecting circuit is fed through a gate amplifier 92 to be made a gate signal of the thyristor 90. Thus, energy stored in the reactor 28 flows circulating through the reactor 28 and the thyristor 90, and any high voltage is not generated in the current source inverter by the energy of the reactor 28.

Figure 7:
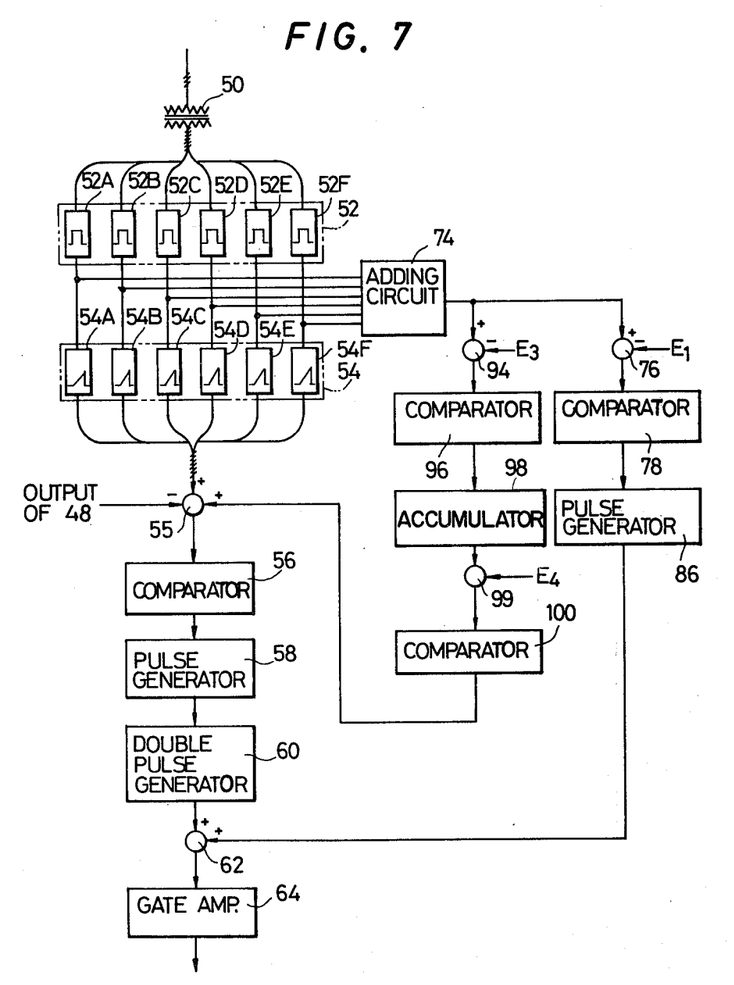
FIG. 7 is a circuit diagram of a protective device of a current source inverter showing a further embodiment of this invention.

FIG. 7 shows a further embodiment of this invention. In the figure, the same symbols as in FIG. 1 represent the same parts. The output of the adding circuit 74 is transmitted to the adder 76, and also to an adder 94. It is compared with a predetermined voltage $E_3$ in the adder 94, and an output of the adder 94 is transmitted to a comparator 96. When the output voltage of the adding circuit has become lower than the predetermined voltage $E_3$, an output signal is transmitted from the comparator 96 to an accumulator 98. An output of the accumulator 98 is compared with a predetermined voltage $E_4$ in an adder 99, and a comparator 100 provides an output when the output of the accumulator has exceeded the predetermined voltage $E_4$. The reason for disposing the accumulator 98, the adder 99 and the comparator 100 is the same as that for disposing the accumulator 80, the adder 82 and the comparator 84 of the embodiment shown in FIG. 1, and is to avoid the instantaneous abnormality of the a.c. power source ascribable to any disturbance. The output of the comparator 100 is transmitted to the adder 55.

The voltage transmitted from the adding circuit 74 to the adder 76 is compared with the predetermined voltage $E_1$. The comparator 78 transmits an output to the pulse generator 86 when the output voltage of the adding circuit 74 has become smaller than the predetermined voltage $E_1$. The pulse generator 86 generates a pulse of predetermined width and transmits it to the adder 62.

The operation of the protective device thus constructed will be described more in detail with reference to a waveform diagram shown in FIG. 8. In the figure, (A) shows an output of the voltage transformer 50. In the illustration, one phase has lacked at a time $t_1$, and two phases or three phases have lacked at a time $t_2$. When one phase has lacked, for example, when the R-phase has lacked, two phases of the S-phase and T-phase are conducted. (B) shows outputs of the respective square wave generating circuits 52A–52F of the square wave generator 52. During the one-phase lacking after the time $t_1$, the square wave generating circuits 52C–52F of the phases except the lacking R-phase provide square waves. (C) shows an output of the adding circuit. This output becomes a voltage of $\frac{2}{3}$ of the ordinary voltage E when the one phase has lacked at the time $t_1$, and it is zero after the time $t_2$. (D) shows an output of the comparator 96. The voltage $E_3$ to be applied to the adder 94 is selected so as to lie between E and $\frac{2}{3}$E. Therefore, the comparator 96 provides the output at the time of the one-phase lacking when the output voltage of the adding circuit 74 becomes smaller than the voltage $E_3$. (E) shows an output of the accumulator 98. (F) shows an output of the comparator 100. The comparator 100 provides an output when the output of the accumulator 98 has become greater than the voltage $E_4$ impressed on the adder 99.

Figure 8:
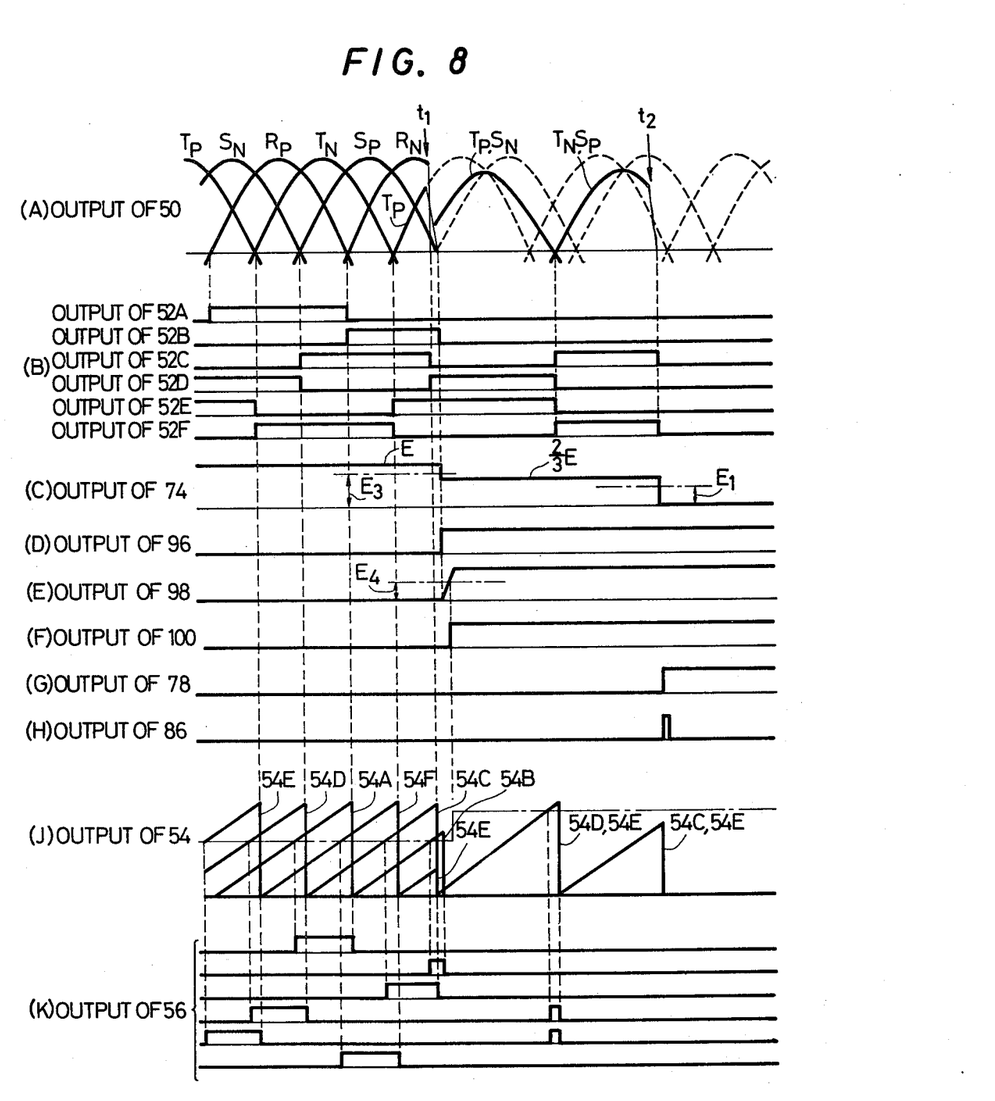
FIG. 8 is a waveform diagram for explaining the circuit operation of the embodiment in FIG. 7.

(G) in FIG. 8 shows an output of the comparator 78. The voltage $E_1$ to be applied to the adder 76 is selected to a voltage between $\frac{2}{3}$E and O. Therefore, the comparator 78 generates the output at the time of the two-phase or three-phase lacking when the output voltage of the adding circuit 74 becomes smaller than the voltage $E_1$. (H) shows an output of the pulse generator 86. The pulse generator 86 provides a pulse of predetermined width when the output from the comparator 78 has been transmitted thereto. (J) shows outputs of the respective triangular wave generating circuits 54A–54F of the triangular wave generator 54. During the lacking of the R-phase, only the triangular wave generating circuits 54C–54F generate triangular waves. During the three-phase lacking, no triangular wave is generated. (K) shows an output of the comparator 56. The comparator 56 operates upon receiving an output of the adder 55 to which an output of the ACR 48, the output of the triangular wave generator 54 and the output of the comparator 100 are transmitted. During the one-phase lacking, the signal of the comparator 100 is transmitted to the adder 55, so that the level to be compared with the triangular wave increases. Therefore, the time of generation of the output signal of the comparator 56 latens, and the direct current converted by the converter 12 decreases. That is, the direct current is contracted. In case where the one-phase lacking continues, the operation of contracting the direct current continues.

Whereas in the case of the one-phase lacking the operation of reducing the current is carried out as described above, in the case of the two-phase or three-phase lacking the bypass pair operation is effected in such a manner that the output of the pulse generator 86 is transmitted to the adder 62 and that gate pulses for rendering the thyristors of the converter 12, e.g., the thyristors 18 and 24 conductive are bestowed on the thyristors 18 and 24 as in the embodiment shown in FIG. 1. Thus, energy stored in the reactor 28 flows through the circulating circuit, and a high voltage can be prevented from being generated by the energy of the reactor 28.

Although this embodiment has been described as transmitting the output of the pulse generator 86 to the adder 62, there may of course be adopted the construction wherein the output of the pulse generator 86 is transmitted to the gate amplifier 87 or 92 as illustrated in FIG. 5 or FIG. 6.

Since this invention is constructed as set forth above, it is possible to detect the power failure of the a.c. input voltage of the converter at high speed and to ignite the thyristor or thyristors of the circuit for circulating the energy of the reactor, and it is reliably preventable that a high voltage is generated within the current source inverter at the power failure by the energy held by the reactor.

We claim:

1. A protective device of a current source inverter comprising a converter which changes alternating current into direct current and which is made up of thyristors, an inverter which changes the d.c. output of said converter into alternating current, a reactor which is connected between said converter and said inverter, control circuitry which controls an output voltage of said converter and an output frequency of said inverter, a square wave generator which changes the alternating current into square waves corresponding to respective polarities of respective phases, an adding circuit which adds the square wave outputs of said square wave generator, a decision circuit which provides an output when an output of said adding circuit has become smaller than a predetermined value, and at least one thyristor which is rendered conductive in response to the output of said decision circuit and forms a circulating circuit for releasing energy stored in said reactor.

2. A protective device of a current source inverter according to claim 1, wherein the at least one thyristor to form the circulating circuit includes at least one pair of thyristors constituting said converter.

3. A protective device of a current source inverter according to claim 2, wherein the output of said decision circuit is added to a control signal for controlling said converter, and the resultant signal is transmitted to the pair of thyristors constituting said converter.

4. A protective device of a current source inverter according to claim 1, wherein the at least one thyristor to form the circulating circuit is connected in parallel with said converter.

5. A protective device of a current source inverter according to claim 1, wherein the at least one thyristor to form the circulating circuit is connected in parallel with said reactor and across terminals thereof.

6. A protective device of a current source inverter according to claim 1, wherein said square wave generator transmits square waves to a triangular wave generator that generates reference phases for igniting said thyristors constituting said converter.

7. A protective device of a current source inverter according to claim 1, wherein said square wave generator changes the alternating current into square waves which are equal to waves of respective phases of the alternating current in polarity and width, said adding circuit adding up the square waves from said square wave generator and providing a total added output.

8. A protective device of a current source inverter comprising a converter which changes three-phase alternating current into direct current and which is made up of thyristors, an inverter which changes the d.c. output of said converter into alternating current, a reactor which is disposed in a d.c. circuit between said converter and said inverter and which serves as a current source, a voltage control circuit which controls an output voltage of said converter, a frequency control circuit which controls an output frequency of said inverter, a square wave generator which changes the three-phase alternating current into six-phase square waves, an adding circuit which adds the six-phase square wave outputs of said square wave generator, a comparator circuit which provides an output when an output of said adding circuit has become smaller than a predetermined value, a malfunction preventing circuit which provides an output when the output of said comparator circuit has continued for a predetermined time, and at least one thyristor which is rendered conductive in response to the output of said malfunction preventing circuit and forms a circulating circuit for releasing energy stored in said reactor.

9. A protective device of a current source inverter according to claim 8, wherein the at least one thyristor to form the circulating circuit includes at least one pair of thyristors constituting said converter.

10. A protective device of a current source inverter according to claim 9, wherein the output of said decision circuit is added to a control signal for controlling said converter, and the resultant signal is transmitted to the pair of thyristors constituting said converter.

11. A protective device of a current source inverter according to claim 8, wherein the at leaston one thyristor to form the circulating circuit is connected in parallel with said converter.

12. A protective device of a current source inverter according to claim 8, wherein the at least one thyristor to form the circulating circuit is connected in parallel with said reactor and across terminals thereof.

13. A protective device of a current source inverter according to claim 8, wherein said square wave generator changes the alternating current into square waves which are equal to waves of respective phases of the alternating current in polarity and width, said adding circuit adding up the square waves from said square wave generator and providing a total added output.

14. A protective device of a current source inverter comprising a converter which changes three-phase alternating current into direct current and which is made up of thyristors, an inverter which changes the d.c. output of said converter into alternating current, a reactor which is disposed in a d.c. circuit between said converter and said inverter and which serves as a current source, a voltage control circuit which controls an output voltage of said converter, a frequency control circuit which controls an output frequency of said inverter, a square wave generator which changes the three-phase alternating current into six-phase square waves, an adding circuit which adds the six-phase square wave outputs of said square wave generator, a first decision circuit which decides whether or not an output of said adding circuit has become a voltage corresponding to lacking of at least one phase in the three-phase a.c. voltage and which provides an output at the time of the lacking of at least one phase, said voltage control circuit being adapted to lower the d.c. output voltage of said converter when the output of said first decision circuit is transmitted, a second decision circuit which decides whether or not the output of said adding circuit has become a voltage corresponding to lacking of at least two phases in the three-phase a.c. voltage and which provides an output at the time of the lacking of at least two phases, and at least one thyristor which is rendered conductive in response to the output of said second decision circuit and forms a circulating circuit for releasing energy stored in said reactor.

15. A protective device of a current source inverter according to claim 14, wherein said first decision circuit provides the output when a period of time in which the voltage corresponding to the lacking of at least one phase continues has exceeded a predetermined value.

16. A protective device of a current source inverter according to claim 14, wherein said square wave generator changes the alternating current into square waves which are equal to waves of respective phases of the alternating current in polarity and width, said adding circuit adding up the square waves from said square wave generator and providing a total added output.

* * * * *